July 21, 1953  C. D. TRUSSELL  2,645,816
MANUFACTURE OF MECHANICAL BINDINGS
Filed March 17, 1950  2 Sheets—Sheet 1
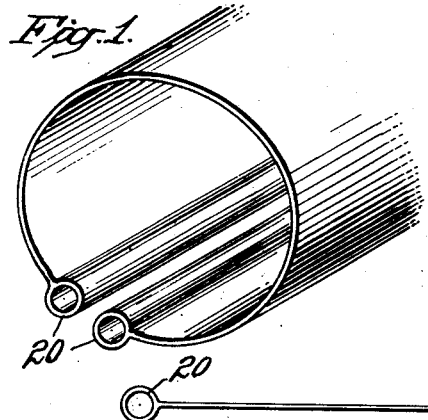
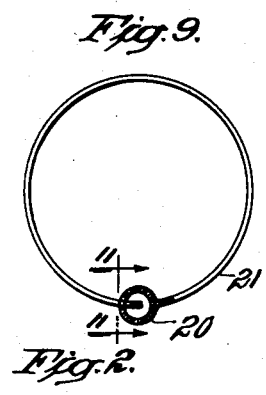
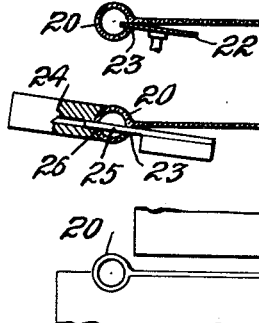
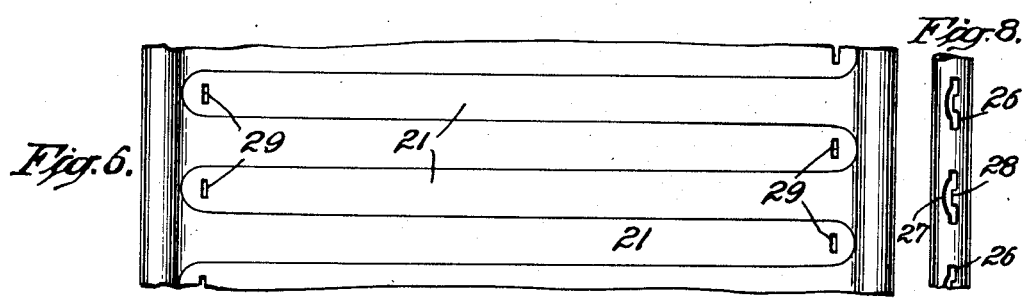
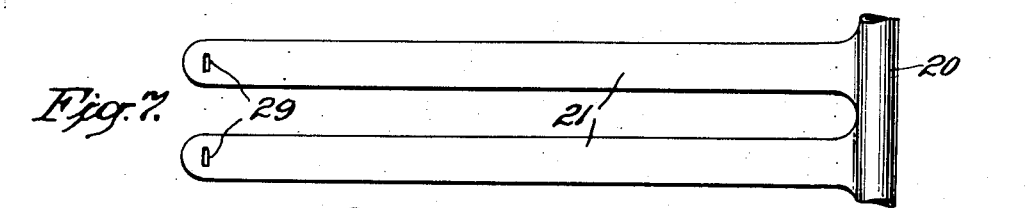
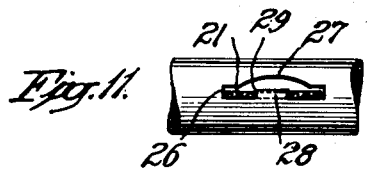
INVENTOR.
CLARENCE D. TRUSSELL
BY
ATTORNEY July 21, 1953  C. D. TRUSSELL  2,645,816
MANUFACTURE OF MECHANICAL BINDINGS
Filed March 17, 1950  2 Sheets-Sheet 2
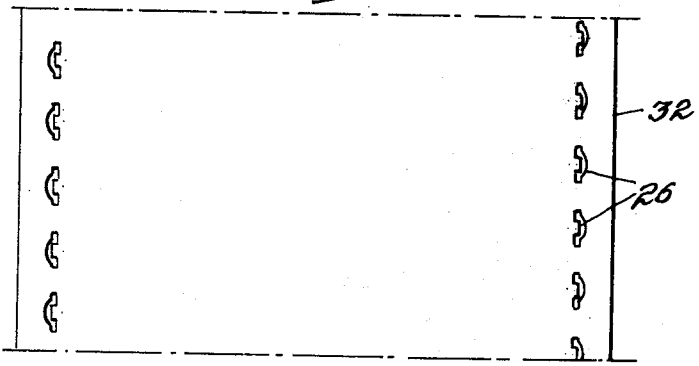
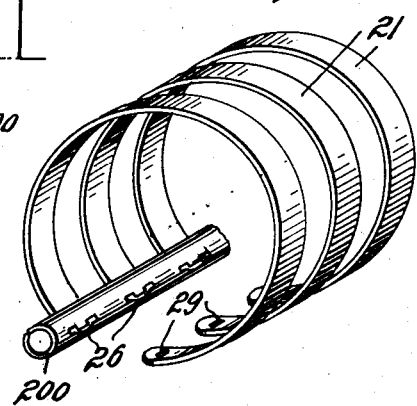
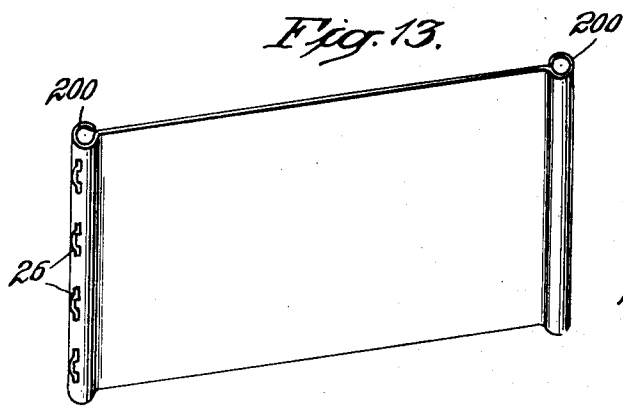
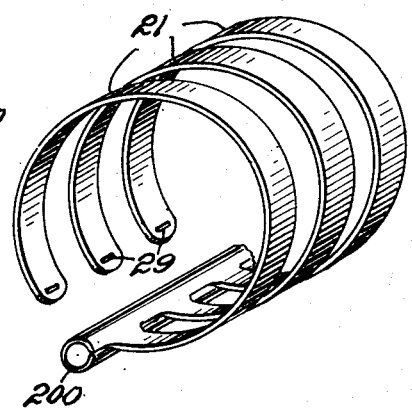
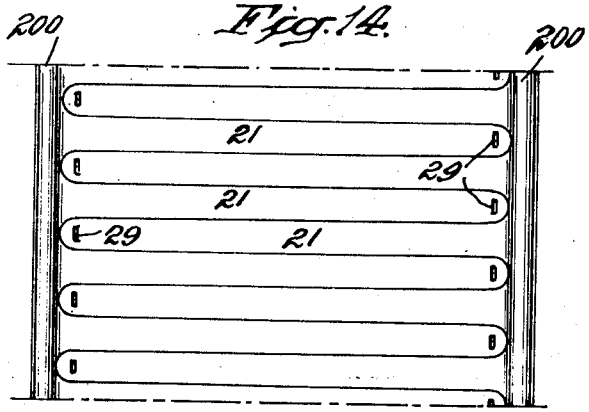
INVENTOR.
CLARENCE D. TRUSSELL
BY
ATTORNEY Patented July 21, 1953

2,645,816

UNITED STATES PATENT OFFICE 2,645,816

MANUFACTURE OF MECHANICAL BINDINGS

Clarence D. Trussell, Turnwood, N. Y.

Application March 17, 1950, Serial No. 150,219

15 Claims. (Cl. 18—47.5)

The invention which is here disclosed relates to the manufacture of mechanical bindings, particularly those of the type covered in co-pending Patents 2,502,493, dated April 4, 1950, and 2,595,427, dated May 6, 1952, in which a rib of tubular formation has ring forming fingers projecting from one side and tucked into slots provided to receive the ends of the fingers, in the opposite side.

Objects of the present invention are to accomplish the manufacture of such bindings automatically, expeditiously and at low cost.

Further special objects of the invention are to effect production of these bindings with simple, low cost equipment and manufacturing methods.

Other desirable objects attained by the invention and the novel features and arrangement of steps through which the purposes of the invention are accomplished are set forth or will appear in the course of the following specification.

The drawings accompanying and forming part of the specification illustrate present preferred practice in the carrying out of the invention, but it will be understood that various factors may be modified and changed, all within the intent and scope of this disclosure without departure from the true invention as hereinafter defined and claimed.

Figure 1 in the drawings is a broken perspective view illustrating tubular stock material from which two sets of oppositely disposed binder blanks may be cut.

Figure 2 is an end elevation showing the stock tube flattened out for performance of slotting and blanking out operations.

Figure 3 is a broken cross sectional view illustrating slotting by saw cuts in the inner sides of the tubular rib portions for admission of the tools which punch out the finger tip receiving slots in the outer sides of the tubular ribs.

Figure 4 is a similar view showing the slot forming punches operating through the saw cut openings.

Figure 5 is a broken end view of the blank severing punch elements.

Figure 6 is a broken plan view of portions of two of the blanks.

Figure 7 is a similar view of one blank separated from the companion blank.

Figure 8 is a broken side view of one of the tubular ribs showing the shape of the slots punched to effect an interlocking engagement with the ends of the ring forming fingers.

Figure 9 is a broken cross sectional view of one of the bindings in the closed condition with the tips of the ring forming fingers interlocked in the rib.

Figure 10 is a broken plan view of the same, with the binder ring at the top appearing in section.

Figure 11 is an enlarged broken sectional detail showing the interlocking engagement between the rib and end of a ring forming finger.

Figures 12 to 16 illustrate another method of manufacture, Figure 12 showing in plan a strip or ribbon of flat material punched with ring locking openings along the edge portions of the same; Figure 13 is a perspective view showing the punched edge portions of the strip rolled to form the tubular ribs; Figure 14 is a plan view showing the stock punched to form the companion blanks; Figure 15 is a broken perspective view showing the finger portions curled to form the rings, and Figure 16 is a similar view showing the oppposite side of the same binding.

The tubular stock illustrated in Figure 1 has the advantage of being fully preformed, with tubular ribs 20 at the edges and intervening, connecting curved web to provide the ring forming fingers 21.

It is contemplated that this stock material be a suitable plastic and that it be produced in this shape by present or further improved methods of extrusion or injection or compression molding. Extrusion methods may be preferred since this provides a uniform product having the desired strength and "set" in the material.

The only operations then required may be just to provide openings in the sides of the tubular ribs to receive the ends of the ring forming fingers and to cut the double blanks apart to form the individual bindings. It is possible, however, and the invention contemplates that slots or openings in the ribs or fingers may be formed in or as part of the extrusion operation.

The slots for the ends of the fingers may be of various shapes, depending on the character of the binding.

Thus to produce the binding in the form disclosed in Patent 2,502,493, or in the form illustrated in co-pending Patent 2,572,681, dated October 23, 1951, the openings may be simply straight slots sized to snugly receive the ends of the fingers.

For the spring form of interlock disclosed in co-pending Patent 2,595,427, special arched slots with intervening locking lugs are required.

The mechanism here illustrated is particularly designed to produce this special interlocking form of slot.

Figure 2 shows the transversely curved tubular stock strip flattened out and held so by rolls, clamps, press members or other such means and in a manner to leave the tubular rib portions 20 at the edges clear for the slotting operations. Preferably the stock which originally is of generally oval cross section, is not flattened out to such an extent as to destroy or objectionably impair the original set. For this reason the flattening out may be only to a partly arched condition.

Figure 3 shows the cutting of the entrance openings for the slotting punches, while the stock is held in the flat or arched formation.

These entrance slots may be made in the extruding operation or be cut in the inner sides of the tubular ribs, as in the illustration, by small circular saws 22, the latter arranged to be advanced and then be retracted after cutting the slots at 23 for entry of the slotting punches.

Figure 4 shows the stock still held flattened out and with the tubular ribs backed up at the outside by dies 24 to accommodate the punches 25 which drive through the openings 23 in the inner sides of the ribs to form the shaped slots 26 in the outer side walls of the ribs.

These locking openings, as best shown in Figures 8 and 11, may be shaped as in Patent 2,595,427 referred to, with an intermediate arched portion 27 in one side and a lug 28 projecting thereinto from the opposite side to effect a transverse bending of the entering ring finger 21 and the locking engagement of a transverse slot 29 in the finger over the locking lug, said lug and the edge of the transverse slot engaged thereby providing overlapping shoulders to hold the end of the finger engaged in the tubular rib.

Figure 5 shows companion punch and die members 30, 31 operating on the flattened and slotted stock to strike out the opposed companion blanks along the lines indicated in Figure 6, and to punch the transverse locking slots 29 in the ends of the finger portions 21.

Finger 7 shows a portion of one of the severed and separated blanks still in the flat condition.

When released from the holding means utilized in the punching and severing operations, the fingers will curl to their original set and which in this case would amount to less than a complete circle due to removal of the material constituting part of the opposing blank. This, under normal circumstances, would leave the fingers curled into incomplete ring forming position, ready to receive the pages, covers, etc., to be held in the binding.

After insertion of the material to be bound, the rings may be closed by suitable ring closing dies or fixtures such as shown in Patents 2,502,493, dated April 4, 1950, and 2,555,947, dated June 5, 1951.

In cases where the ring fingers are given a set to bias them in the ring closed condition, as in co-pending Patent 2,572,681, special dies may be employed, as disclosed in that patent to effect opening of the rings to admit the material to be bound and to then permit the ends of the rings to close into the slots in the rib.

In performing these operations, heating and cooling and various intermediate shaping steps may be performed if and as required to accomplish the results outlined.

While the preformed tubular type stock may be preferred, the invention contemplates that the stock may be made up of a flat strip or ribbon such as indicated at 32, Figure 12, be punched along the edges to provide the desired ring end admitting slots 26, and these edges, after punching, then be rolled as shown in Figure 13 to provide the tubular rib portions 200.

After these preliminary punching and forming operations the stock may then be punched as in Figure 14, the same, except for the holding, as first described, to effect severance of the two opposed blanks and in this particular case, to put the transverse locking slots 29 in the ends of the ring forming fingers 21.

After production of the blanks as described, the ring forming fingers may be curled and given the desired set, as illustrated in Figures 15 and 16, ready to receive the material for binding and to be then forced closed and interlocked in the tubular rib.

If the rings are to be of the self-closing type, as in Patent 2,572,681, the bending and setting of the ring forming fingers may be such as to bias them past the fully closed position so that they will hold closed once they are entered in the slots in the tubular rib.

The operations described may be performed in a complete sequence of steps, by automatic or semi-automatic means and of relatively low cost, simple construction.

While convenient to strike the slots 29 which provide the locking shoulders at the ends of the ring fingers in the blanking or severing operation, this finger slotting action may be performed before or after the severing operation. All the actions described may be performed in a continuous step by step operation or independently as successive steps on different machines.

The severing operation by which the intervening web or sheet material between the tubular ribs at the edges of the stock is cut in zigzag fashion into transversely extending fingers alternately connected with the ribs at the opposite edges of the stock may be performed as a simple press operation.

While the cross sectional shape of the tubular stock may vary, the oval shape indicated in Fig. 1 is at present preferred since it assures that the rings when closed will be substantially circular, as shown in Fig. 9.

Instead of intermittently slotting the tubular ribs as at 23 in Fig. 3, by rotary saws or cutters, it is contemplated that these rotary cutters may form continuous slots in the undersides of the ribs, and in which event these slots might be opened at the points where the slotting punches 25 operate, by wedges or spreaders which will temporarily hold the continuous cuts open while the punches are striking out the finger tip receiving slots in the outer sides of the tubular ribs.

What is claimed is:

1. The herein disclosed method of manufacturing a mechanical binding comprising providing stock of sheet material having tubular ribs along opposite edges of the same, forming slots in the sides of the ribs, separating the intervening sheet material between the ribs on staggered lines defining transversely extending alternately arranged fingers connected with the respective ribs and having end portions in substantial alignment with and of a width to enter the slots in the ribs and at one stage imparting ring forming curvature to said fingers.

2. The herein disclosed method of manufacturing a mechanical binding comprising providing stock of sheet material having tubular ribs along opposite edges of the same, forming slots in the sides of the ribs, separating the intervening sheet material between the ribs on staggered lines defining transversely extending alternately arranged fingers connected with the respective ribs and having end portions in substantial alignment with and of a width to enter the slots in the ribs and at one stage imparting ring forming curvature to said fingers and finally seating the free ends of said fingers in said slots in the tubular ribs.

3. The herein disclosed method of manufacturing a mechanical binding comprising providing stock of sheet material having tubular ribs along opposite edges of the same, forming slots in the sides of the ribs, separating the intervening sheet material between the ribs on staggered lines defining transversely extending alternately arranged fingers connected with the respective ribs and having end portions in substantial alignment with and of a width to enter the slots in the ribs and at one stage imparting ring forming curvature of said fingers and in said act of separating the blanks providing shoulders on the end portions of the fingers to interlock with edge portions of said slots in the ribs.

4. The herein disclosed method of manufacturing a mechanical binding comprising providing stock of sheet material having tubular ribs along opposite edges of the same, forming slots in the sides of the ribs, separating the intervening sheet material between the ribs on staggered lines defining transversely extending alternately arranged fingers connected with the respective ribs and having end portions in substantial alignment with and of a width to enter the slots in the ribs and at one stage imparting ring forming curvature of said fingers and in said act of separating the blanks providing shoulders on the end portions of the fingers to interlock with edge portions of said slots in the ribs and in forming said slots in the ribs providing lugs on the edges of said slots which will interlock with said shoulders on the fingers to secure the ends of the latter in the tubular ribs.

5. The herein disclosed method of manufacturing mechanical bindings comprising forming an open tube of sheet material with tubular ribs along opposite edges of the same, slotting the tubular ribs and severing the intervening tube forming sheet material connecting the ribs into ring forming fingers alternately connected with the respective ribs of a curvature approximating the original open tube formation, in substantial alignment with said slots and of a width at the free ends to enter said slots in the ribs.

6. The herein disclosed method of manufacturing mechanical bindings comprising forming an open tube of sheet material with tubular ribs along opposite edges of the same, slotting the tubular ribs and severing the intervening tube forming sheet material connecting the ribs into ring forming fingers alternately connected with the respective ribs of a curvature approximating the original open tube formation, in substantial alignment with said slots and of a width at the free ends to enter said slots in the ribs and holding the open tubular structure in flattened condition while slotting and separating into opposing blanks as described.

7. The herein disclosed method of manufacturing mechanical bindings comprising forming an open tube of sheet material with tubular ribs along opposite edges of the same, slotting the tubular ribs and severing the intervening tube forming sheet material connecting the ribs into ring forming fingers alternately connected with the respective ribs of a curvature approximating the original open tube formation, in substantial alignment with said slots and of a width at the free ends to enter said slots in the ribs, holding the tubular structure in an out of circular form while performing said slotting and severing operations and thereafter permitting the severed blanks to return to the shape originally imparted by the tubular form of structure.

8. The herein disclosed method of manufacturing mechanical bindings comprising providing web material having tubular ribs along opposite edges of the same, blanking said web material into finger portions alternately connected with the opposite ribs and providing slots in the ribs for reception of the ends of said finger portions and shaped to impart transverse curvature to said finger portions in entering said slots.

9. The herein disclosed method of manufacturing mechanical bindings comprising providing web material having tubular ribs along opposite edges of the same, blanking said web material into finger portions alternately connected with the opposite ribs and providing slots in the ribs for reception of the ends of said finger portions and shaped to impart transverse curvature to said finger portions in entering said slots and further providing interengaging shoulders on the finger portions and slots which will interlock when said finger portions are forced in transversely flexing engagement into said slots.

10. The herein disclosed method of manufacturing mechanical bindings comprising providing web material having tubular ribs along opposite edges of the same, blanking said web material into finger portions alternately connected with the opposite ribs and providing slots in the ribs for reception of the ends of said finger portions and shaped to impart transverse curvature to said finger portions in entering said slots and cross slotting the entering ends of said finger portions and providing lugs to enter said finger slots on the edges of said receiving slots in the tubular ribs.

11. The herein disclosed method of manufacturing mechanical bindings comprising extruding plastic material in an open tubular form having tubular ribs along the opposite edges, severing the tubular portion of the stock between said ribs into ring forming fingers alternately connected with the opposite ribs and providing slots in the tubular ribs to admit the ends of said ring forming fingers.

12. The herein disclosed method of manufacturing mechanical bindings comprising providing stock material having tubular ribs along opposite edges, cutting entrance slots in the inner wall portions of said ribs, supporting the outer wall portions of said ribs and operating punches through said entrance slots to form slots in the outer wall portions of said ribs and severing the intervening web portion of the stock between said tubular ribs into ring forming fingers positioned and sized to enter said slots in the outer wall portions of the ribs.

13. The herein disclosed method of manufacturing mechanical bindings comprising providing stock material having a web and a connected tubular rib portion, cutting the web portion into ring forming fingers connected with the rib and slotting the rib to receive the ends of said ring forming fingers.

14. The herein disclosed method of manufacturing mechanical bindings comprising providing stock material having a web and a connected tubular rib portion, cutting the web portion into ring forming fingers connected with the rib and slotting the rib to receive the ends of said ring forming fingers and in said operations forming shoulders on said tubular rib and fingers which will interlock to hold the fingers in ring forming shape when the ends of said fingers are entered in said slots.

15. The herein disclosed method of manufacturing mechanical bindings, comprising providing open tubular stock material substantially oval in cross section and having tubular ribs along the edges of the same and then blanking out the ovular portion between the tubular ribs into fingers alternately connected with the respective tubular ribs and slotting each of said ribs in line with and in the side opposite the side to which the fingers are connected and whereby said fingers may be closed on the ribs into substantially circular form with the ends of the same entered in said slots.

CLARENCE D. TRUSSELL.

References Cited in the file of this patent

UNITED STATES PATENTS

| Number | Name | Date |
|---|---|---|
| 2,211,744 | Nelson | Aug. 13, 1940 |
| 2,233,719 | Vanderveld | Mar. 4, 1941 |
| 2,266,593 | Emmons | Dec. 16, 1941 |
| 2,354,094 | Thomas | July 18, 1944 |
| 2,491,527 | Spinner | Dec. 20, 1949 |